United States Patent [19]
Ramos et al.

[11] 4,152,139
[45] May 1, 1979

[54] METHOD FOR COOLING SPONGE METAL

[75] Inventors: Hector L. Ramos, Monterrey; Leobardo C. Martinez, San Nicolas de los Garza, both of Mexico

[73] Assignee: Hylsa, S.A., Mexico

[21] Appl. No.: 876,361

[22] Filed: Feb. 9, 1978

[51] Int. Cl.² ............................................. C21B 13/02
[52] U.S. Cl. .......................................... 75/35; 75/26; 75/91
[58] Field of Search .......................... 75/34, 35, 26, 91

[56] References Cited
U.S. PATENT DOCUMENTS

| | | | |
|---|---|---|---|
| 4,046,556 | 9/1977 | Celada et al. | 75/35 |
| 4,067,728 | 1/1978 | MacKay | 75/35 |

Primary Examiner—M. J. Andrews
Attorney, Agent, or Firm—Curtis, Morris & Safford

[57] ABSTRACT

The cooling of sponge iron produced in a multiple reactor unit batch system for reducing iron ore is enhanced by using an extended cooling cycle wherein the reactor previously isolated at the end of a cycle for discharge and recharging in prior art systems is retained on stream for a portion of the succeeding cycle.

12 Claims, 6 Drawing Figures

METHOD FOR COOLING SPONGE METAL

This invention relates to the gaseous reduction of metal ores to produce sponge metal, and more particularly, to an improved method of cooling the sponge metal produced in such a gaseous reduction process. For convenience the process will be described herein as applied to the reduction of iron ore and to the cooling of sponge iron that is produced, although as the description proceeds it will become apparent that the process can also be used in the treatment of other types of ores as well.

In one type of gaseous reduction process for producing sponge iron the iron ore in particulate form is reduced and the resulting sponge iron is cooled in a multistage batch system comprising a series of cooling and reduction reactors containing fixed beds of the iron-bearing material through which the gas flows. As described more fully below, the system is operated cyclically and the reactors are so interconnected as to be functionally interchangeable at the end of each operating cycle. In the following description for purposes of convenience a reactor that is performing a cooling function at the part of the operating cycle being described will be referred to simply as a cooling reactor and a reactor that is performing a reducing function at the part of the cycle being described will be referred to simply as a reduction reactor, even though it is apparent that because of the cyclic operation of the system each reactor thereof will at one time be a cooling reactor, at another time a reduction reactor, and at still another time a discharge and charging reactor.

Systems of the type referred to above are disclosed in U.S. Pat. Nos. 3,136,623; 3,423,201; and 3,890,142. As shown in these patents, such systems include, in addition to two or more reduction reactors, a cooling reactor for cooling the reduced ore from the reducing temperature to a temperature close to the ambient temperature. The present invention relates particularly to a method of so operating the cooling reactor of the system as to improve the cooling of the sponge iron produced by reduction of the iron ore.

In a gaseous reduction system of the type disclosed in the above-mentioned patents the cooling of the sponge iron is an important part of the process. Upon removal from the reactor the sponge iron has a tendency to reoxidize, especially if portions of the product are insufficiently cooled. In general the reoxidation reactions are exothermic and temperature sensitive. Hence hot spots in the mass of sponge iron removed from the reactor can initiate a chain oxidation reaction leading to a considerable decrease in the degree of metallization of the product. In an integrated steel mill where the discharged sponge iron is transferred in a relatively short period of time to a steel-making furnace, the tendency of the sponge iron to reoxidize does not ordinarily cause any difficulty. However, where the sponge iron is to be stored for an extended period of time in contact with atmospheric air or shipped to a remote point for use, spontaneous reoxidation can be a problem.

In conventional systems of the type disclosed in the above-mentioned patents cooling of the sponge iron is effected by passing a current of cooled gas downwardly through the hot reduced sponge iron bed. While theoretically any cool, non-oxidizing gas could be used, it has been customary to use the fresh reducing gas as a cooling medium and then pass it in series through the reduction reactors of the system for effecting reduction of the iron ore. The downwardly flowing cooling gas is removed through a plenum chamber near the bottom of the reactor, then cooled and a portion thereof recycled for further cooling of the sponge iron bed in the cooling reactor. The remainder of the cooled gas flows to the last stage reduction reactor.

As disclosed in U.S. Pat. No. 3,423,201, during the early portion of the cooling cycle it is desirable to use a relatively low gas flow to increase the degree of metallization of the sponge iron and to effect a desired degree of carburization thereof, whereas during the latter portion of the cooling cycle rapid cooling to ambient temperature is desirable. Thus single pass cooling or a relatively low recycle ratio is desirably used at the beginning of the cooling cycle and a relatively high recycle ratio is desirably used in the latter portion of the cooling cycle.

The gas flow pattern within the cooling reactor is such that a small portion of the sponge iron bed at the bottom of the reactor is out of the main stream of cooling gas flow. With this flow pattern it becomes possible for a certain proportion of the sponge iron particles near the bottom of the reactor to be insufficiently cooled. Such insufficiently cooled sponge iron particles can form "hot spots" in the mass of discharged sponge iron. While such "hot spots" can be eliminated by spreading the sponge iron over a large area to permit them to be air cooled, the elimination of "hot spots" in this way is a laborious and time-consuming process.

It is accordingly an object of the present invention to provide an improved method of cooling the sponge iron in a bed of sponge iron in a cooling reactor of a gaseous iron ore reduction system. It is another object of the invention to provide for more extensive cooling of the sponge iron in such a system without lengthening the over-all reduction and cooling cycle and without increasing the capacity of the recirculation equipment. Other objects of the invention will be in part obvious and in part pointed out hereafter.

The objects and advantages of the invention can best be understood and appreciated by reference to the accompanying drawings which illustrate diagrammatically apparatus capable of being used to carry out several embodiments of the invention and wherein.

As conducive to a clearer understanding of the present invention, it may be pointed out that a four-reactor batch system of the type shown in the above-identified patents commonly comprises a single reactor that is at the cooling stage and two reactors at the reduction stage, with the fourth reactor being isolated from the system for discharge of sponge iron therefrom and recharging with fresh ore. The system is operated cyclically with the duration of each cycle being typically three or four hours. During each operating cycle the cool reducing gas flows first through the reactor that is at the cooling stage and then successively through a reactor that is at the second reduction stage and a reactor that is at the first reduction stage. The gas is preheated to a temperature of say 700° to 1100° C. before being fed to each of the reduction reactors and is cooled after leaving each reduction reactor to remove water vapor therefrom.

At the end of an operating cycle the connections between the reactors are interchanged to cause the charging reactor to become a first stage reduction reactor, the first stage reduction reactor to become a second stage reduction reactor, the second stage reduction reactor to become a cooling reactor and the cooling reactor to become a discharging and charging reactor. In the prior art systems the duration of an operating cycle was the same for each of the four reactors.

The objects of the invention are achieved in general by using an extended gas cycle. In a conventional system referred to above the cooling reactor at the end of an operating cycle is disconnected from the system and arranged for discharge of sponge iron therefrom. In a system according to the present invention, on the other hand, the cooling reactor at the end of an operating cycle remains connected to the system for a portion of the next operating cycle. Thus during the initial portion of each operating cycle the system comprises two cooling reactors and two reduction reactors. The operating cycle is, in effect, divided into two time periods, during the first of which two reactors are at the cooling stage and during the second of which only one reactor is at the cooling stage.

It will be evident that this additional cooling capacity is achieved at the expense of a shortened charging and discharging period. For example, if the duration of the operating cycle is three hours and a reactor is kept at the cooling stage for four hours, the time available for discharging the sponge iron from the charging reactor and re-filling it with fresh ore is reduced to two hours. It has been found that as a practical matter the length of a cooling cycle can be substantially extended in this way while still providing sufficient time to carry out the discharging and ore charging operations.

Figure 1:
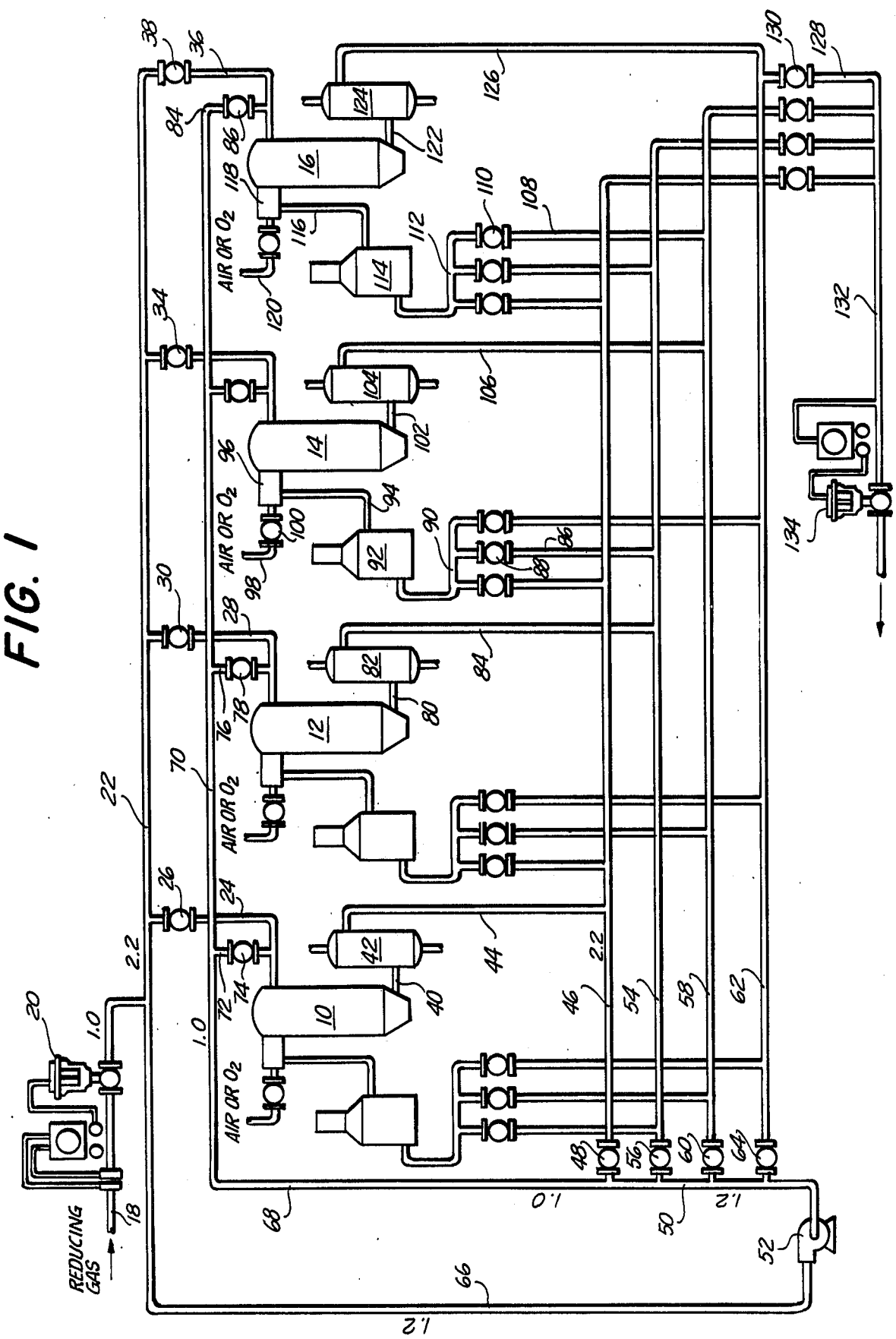
FIG. 1 illustrates a 4-reactor system adapted to be used in carrying out a typical embodiment of the invention.

Referring now to the drawings, and more particularly to FIG. 1, the system there illustrated comprises the reactors 10, 12, 14 and 16. The system will initially be described in terms of its operating mode at the beginning of an operating cycle. In this operating mode reactors 10 and 12 are cooling reactors and reactors 14 and 16 are reduction reactors. A reducing gas composed largely of carbon monoxide and hydrogen to effect a reduction of the iron ore enters the system through a pipe 18 provided with a flow controller 20. The reducing gas can be obtained from any of various known sources. For example, it may be obtained from the catalytic conversion of a mixture of natural gas and steam as disclosed in the patents identified above. Other sources of such reducing gas mixtures are known in the art.

From pipe 18 the reducing gas flows to a feed gas header 22 connected by a branch pipe 24 containing valve 26 to reactor 10, by a branch pipe 28 containing valve 30 to reactor 12, by a branch pipe 32 containing valve 34 to reactor 14, and by a branch pipe 36 containing valve 38 to reactor 16. In the operating mode here being described, valves 30, 34 and 38 are closed, and valve 26 is open to cause the fresh reducing gas to flow initially to the reactor 10. This reactor contains a bed of sponge iron that has been largely cooled in a previous operating cycle. The cooled reducing gas flows downwardly through the sponge iron bed in reactor 10 and out through pipe 40 to a cooler 42 wherein the effluent gas from the reactor is quench cooled to remove heat absorbed from the bed of sponge iron through which it has passed.

From cooler 42 the gas flows through pipe 44 to a gas recycle header 46 containing a valve 48 and thence through a pipe 50 to the suction side of circulating pump 52. In order to provide the functional interchangeability referred to above, a plurality of gas recycle headers similar to the header 46 are provided. Thus the system includes recycle header 54 containing valve 56, header 58 containing valve 60, and header 62 containing valve 64, all of which lead to the pipe 50 connected to the suction side of pump 52. During the operating mode here being described, valve 48 is open and valves 56, 60 and 64 are closed.

As will be described, the effluent gas from the reactor 10 flowing through pipe 46 is divided and only a portion of the gas is recirculated with the remainder being transferred to the reactor 12. The recirculated portion of the cooled effluent gas from reactor 10 is pumped by pump 52 through a pipe 66 to the reducing gas feed header 22 and thence through pipe 24 back to the reactor 10. The remainder of the cooled effluent gas from reactor 10 flows through a pipe 68 to the gas transfer header 70. This transfer header is connected by pipe 72 containing valve 74 to reactor 10, by pipe 76 containing valve 78 to reactor 12, by pipe 80 containing valve 82 to reactor 14, and by pipe 84 containing valve 86 to reactor 16. In the operating mode now being described the valve 78 is open and the valves 74, 82 and 86 are closed so that the non-circulated portion of the effluent gas from reactor 10 flows through pipe 76 to the second cooling reactor 12.

In the operating cycle prior to that here being described the reactor 12 was a second stage reduction reactor. Hence reactor 12 contains a relatively hot body of sponge iron through which the cooling gas entering from pipe 76 flows to effect a partial cooling of the sponge iron body. Effluent gas from reactor 12 flows through pipe 80 to a quench cooler 82 similar to the cooler 42, and thence through pipe 84 to the header 54, through which gas is supplied to the second stage reduction reactor 14.

More particularly, the effluent gas from reactor 12 flows through a portion of header 54 to a pipe 86 containing a valve 88 and thence through a pipe 90 to a heater 92 wherein the gas is heated to an elevated temperature, for example, 700° to 900° C. From heater 92 the hot gas flows through pipe 94 to a combustion chamber 96 communicating with the top of reactor 14. The combustion chamber 96 may be of the type disclosed in Celada U.S. Pat. No. 2,900,247 and it is supplied with air or oxygen through pipe 98 containing valve 100. The air or oxygen serves to promote combustion of a minor amount of the reducing gas to raise its temperature to say 900° C. to 1100° C. before the gas enters the reactor 14. The heater 92 and combustion chamber 96 may be replaced by a high temperature heater of a type known in the art capable of heating the gas to the desired reduction temperature in a single step.

Each of the reactors 10, 12 and 16 is provided with a heater similar to the heater 92 and a combustion chamber similar to combustion chamber 96 and each heater is connected to one of the gas headers 46, 58 or 62 so that reactors 10, 12 and 16 can be operated as second stage reducing reactors in other operating cycles. In the operating mode here being described, the valves corresponding to valve 88 that are associated with the reactors 10, 12 and 16 are closed.

Effluent gas from the reactor 14 flows through pipe 102 to a quench cooler 104 similar to the coolers 42 and 82 and thence through pipe 106 to header 58, from which the gas flows to the first stage reduction reactor 16. More particularly, the gas flows through pipe 108 containing valve 110 to pipe 112 and hence to heater 114 which is similar to the heater 92. The heated gas from heater 114 flows through pipe 116 to the combustion chamber 118 communicating with reactor 16. Combustion chamber 116 can be supplied with air or oxygen through pipe 120 to effect partial combustion of the reducing gas as described above.

The reactor 16 contains freshly charged ore and the hot gas from combustion chamber 118 flows downwardly through the ore to effect a partial or first stage reduction thereof. Effluent gas from reactor 16 flows through pipe 122 to a quench cooler 124 similar to the coolers 42, 82 and 104, and thence out of the system. More particularly, the cooled gas from cooler 124 flows through pipe 126 to the header 62 and thence through branch pipe 128 containing valve 130 to the spent gas discharge pipe 132 which contains a back pressure controller 134. While the spent gas flowing through pipe 132 can be discarded, it normally contains a sufficient amount of combustible components to be used as a fuel in, for example, the heaters 92 and 114, or for other fuel or reducing applications.

From the foregoing description it will be apparent that the cooling reactors 10 and 12 are operated in series at the beginning of an operating cycle. The entering fresh gas flows to and through the first cooling reactor 10 and the effluent gas from reactor 10 is cooled with a portion of the cooled effluent gas being recirculated back to the same reactor and a portion being transferred to cooling reactor 12. The rate of recirculation of gas to the first cooling reactor can be varied over relatively wide limits. Thus the ratio of recirculated gas to fresh reducing gas supplied to the system may vary between 0.5:1 and 2:1. Typical cool gas flows are indicated in FIG. 1 in terms of a unitary flow rate of fresh reducing gas, i.e., assuming a fresh gas feed rate of 1.0 units. On this assumption the gas recirculated by pump 52 through pipe 66 may be 1.2 units to give a flow of 2.2 units into the cooling reactor 10. Since 1.2 units of the effluent gas are recirculated, the remaining 1.0 unit is transferred through pipe 68 to the second cooling reactor 12.

The foregoing description refers to the operating mode during the initial portion of an operating cycle. As indicated above, in accordance with the present invention the operating cycle of the system is divided into two time periods, namely, a first period which may comprise 25% to 50% of the total duration of an operating cycle and wherein two cooling reactors are connected in series, and a second time period wherein only a single cooling reactor is used. At the end of the first time period the reactor 10 is isolated from the system by closing valves 26, 74 and 48. Cooled sponge iron is then discharged from reactor 10 which is then re-charged with fresh ore.

During the second time period of the operating cycle the reactor 12 is the sole cooling reactor. Thus at the beginning of the second time period, valve 30 is open to cause the fresh gas from the feed header 22 to flow into reactor 12. Also valve 56 is opened and valve 78 is closed to cause a certain amount of recirculation of gas by pump 52 back to header 22 and thence to reactor 12. The temperature of the sponge iron within the reactor 12 at the beginning of the second time period of the operating cycle is still relatively high. As is known in the art, a certain proportion of the reduction of the oxides present in the sponge iron occurs within the cooling reactor. Also it is desirable to produce a predetermined amount of carburization of the sponge iron within the cooling reactor. For both of these reasons it is desirable during the early stages of the cooling process to reduce the temperature at a relatively slow rate so that effective reduction of residual amounts of oxide in the sponge iron and the desired carburization will take place. Accordingly the recycle ratio at the beginning of the second time period is desirably kept at a relatively low value and then increased during the last portion of the cooling period. This change in recycle ratio is indicated in FIGS. 3 and 4 of the drawings which will now be described.

Figure 3:
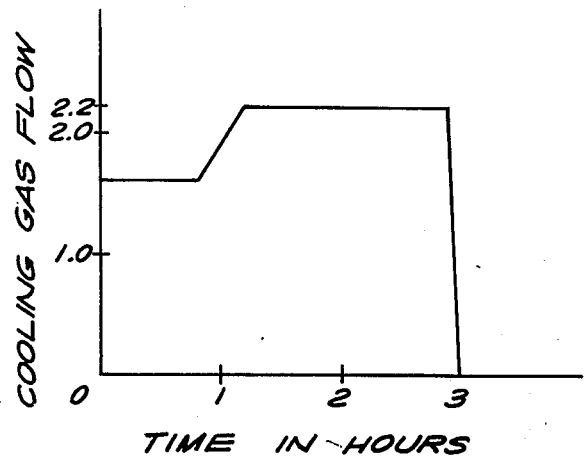
FIG. 3 is a graph showing cooling gas flow in a conventional prior art cooling reactor.
Figure 4:
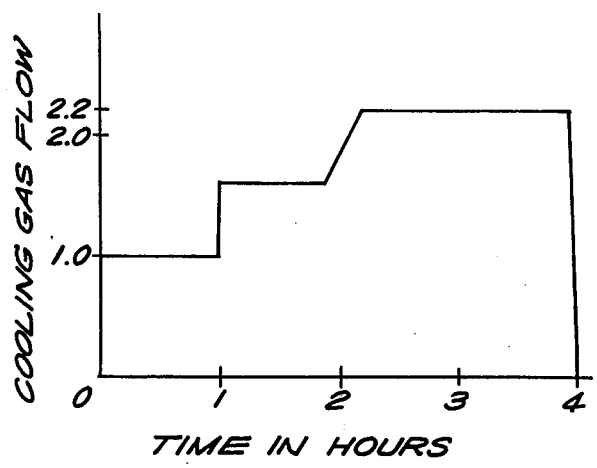
FIGS. 4 to 6 are graphs showing cooling gas flow for the three embodiments of the present process described herein.

In general, FIG. 3 and FIG. 4 are graphs of the relationship between cooling gas flow and time in hours for a prior art system and for a system embodying the present invention, respectively. In each case the area under the curve is a measure of the amount of cooling gas passed through the reactor. Referring first to FIG. 3, this curve represents the cooling schedule used in the single cooling reactor of a conventional four-reactor system. As indicated, two recycle ratios are commonly used. At the beginning of the cooling cycle the recycle ratio is about 0.6:1 and this lower ratio is used for the first hour of cooling, after which the ratio is increased to 1.2:1 for the remainder of the cooling cycle.

Referring to FIG. 4, this figure illustrates a representative cooling pattern of a reactor which is functionally equivalent to the reactor 12 for the first three hours of a four-hour cycle and functionally equivalent to the reactor 10 during the fourth hour of the cycle. As indicated in FIG. 4, when considered in conjunction with the foregoing description, a cooling reactor having this flow pattern receives gas at the flow rate of 1.0 units from another cooling reactor of the system during the first hour of cooling. Thereafter the other cooling reactor (e.g., reactor 10) is disconnected from the system and the cooling reactor corresponding to FIG. 4 operates for an additional hour with a recirculated cooled gas ratio of 0.6:1. Between the second and third hour the recirculation rate is increased sufficiently to cause 2.2 flow units to flow through the reactor and this flow rate is maintained until the end of the third hour. At the end of the third hour the reactor connections are changed to make the FIG. 4 reactor functionally equivalent to reactor 10 of FIG. 1 and the reactor is operated at a flow rate of 2.2 units for the remaining hour of the cooling cycle.

From a comparison of FIGS. 3 and 4, it is evident that the additional cooling obtained by employing the present invention corresponds to the area under the curve of FIG. 4 for the first hour of cooling. Thus by using the system illustrated in FIG. 1 a substantial increase in cooling of the sponge iron is obtained without any increase in the duration of the operating cycle.

Figure 2:
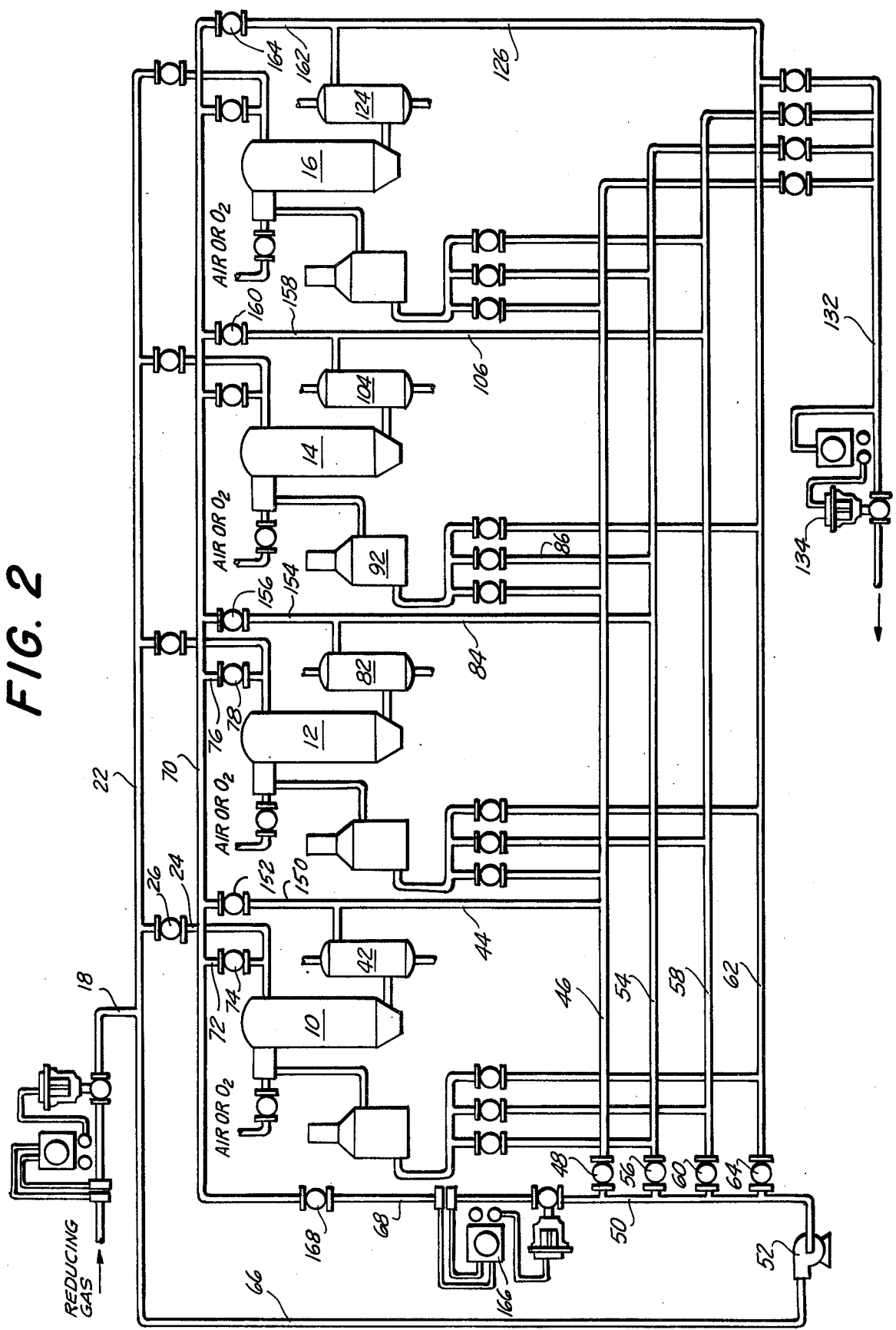
FIG. 2 illustrates a modified system for carrying out two other embodiments of the invention.

Turning now to FIG. 2 of the drawings, the system there shown is closely similar to the system of FIG. 1 and hence the same reference characters will be used to identify corresponding parts in the two Figures. The principal difference between FIG. 2 and FIG. 1 is that, for reasons that will be explained below, the effluent gas pipe from each reactor in the system of FIG. 2 is connected with the transfer header 70. More particularly, transfer header 70 is connected by pipe 150 containing valve 152 with effluent gas pipe 44, by pipe 154 containing valve 156 with effluent gas pipe 84, by pipe 158 containing valve 160 with effluent gas pipe 106, and by pipe 162 containing valve 164 with effluent gas pipe 126.

In the operating mode described above, the system during the initial portion of an operating cycle comprises two cooling reactors connected in series with recirculation of the cooling gas only in the first cooling reactor. In accordance with a second operating mode now to be described two series-connected cooling reactors are also used, but a portion of the effluent gas from each cooling reactor is mixed and the mixture recirculated to the first cooling reactor. In FIG. 2, as in FIG. 1, fresh reducing gas from pipe 18 flows through pipe 24 into the reactor 10. However, the effluent gas leaving quench cooler 42, instead of flowing through pipes 44 and 46 to pipe 50, flows through pipe 150 to the transfer header 70. The gas delivered by pipe 150 to transfer header 70 is divided with a portion thereof flowing through branch pipe 76 into reactor 12 and a second portion flowing through pipe 68 to pipe 50 and the suction of pump 52. Cooled effluent gas from the reactor 12 flows through pipe 84 to pipe 52 wherein it divides with a portion flowing through pipe 86 to heater 92 and a second portion flowing to the suction of recirculating pump 52. In order to bring about this change in flow pattern, valve 48 is closed and valve 56 is open. During this second operating mode valve 152 is open and valves 156, 160 and 164 are closed. Illustrative flows in the system of FIG. 2 when using this second operating mode may be as follows:

Pipe 18—1.0 units
Pipe 24—2.2 units
Pipe 150—2.2 units
Pipe 76—1.6 units
Pipe 68—0.6 units
Pipe 84—1.6 units
Pipe 86—1.0 units
Pipe 54 (toward pump)—0.6 units
Pipe 66—1.2 units The flow controller 166 is provided in pipe 68 to bring about the desired flow of a portion of the cooled effluent gas from reactor 10 to the reactor 12.

Figure 5:
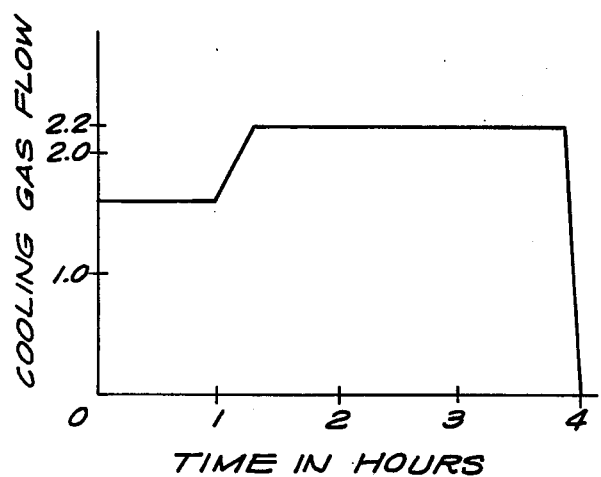

The cooling pattern achieved with this second operating mode is shown in FIG. 5 of the drawings. With the flow values as listed above, the recycle ratio is 0.6:1 during the first hour of cooling and then rises to 1.2:1 for the remaining three hours that the reactor is at the cooling stage. Here again the area under the curve represents the total cooling achieved and this cooling is greater than that shown in FIG. 4 and substantially greater than that shown in FIG. 3.

The system of FIG. 2 can also be used in accordance with a third operating mode wherein during the initial portion of the cycle two series-connected cooling reactors are used with all of the cooling gas flowing in series through the reactors and a portion of the effluent gas from the second cooling reactor being recycled. This mode of operation can be achieved by closing a shut-off valve 168 in pipe 68 so that all of the cooled effluent gas from reactor 10 passes through pipe 150 to transfer header 70 and thence through pipe 76 to reactor 12. As in the case of the second operating mode, the cooled effluent gas from reactor 12 flowing through pipe 84 is divided with a portion thereof going to pipe 86 and heater 92 and the remainder flowing through header 54 to the suction side of pump 52. The gas recycled by pump 52 is returned to cooling reactor 10 through pipe 24. Typical gas flows for the system of FIG. 2 when utilizing the foregoing third operating mode are as follows:

Pipe 18—1.0
Pipe 24—2.2
Pipe 66—1.2
Pipe 150—2.2
Pipe 84—2.2
Pipe 86—1.0
Pipe 54 (toward valve 56)—1.2

Figure 6:
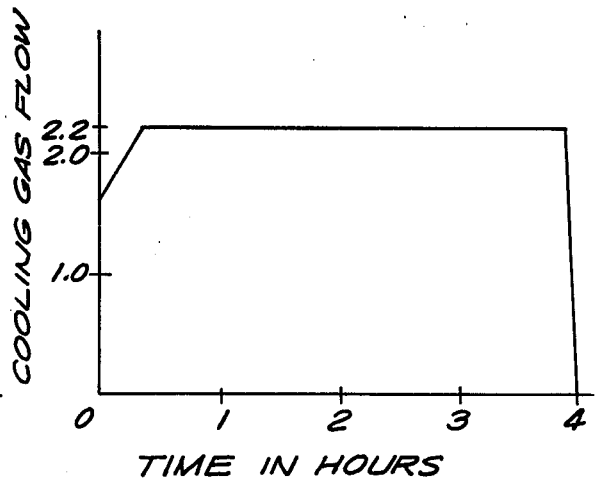

The cooling pattern when employing the above-described third operating mode of the system is illustrated in FIG. 6 of the drawings. As indicated in FIG. 6, the relatively high recycle ratio of 1.2:1 is used for substantially the entire period that the reactor operates at the cooling stage. It should be noted, however, that while as indicated in FIG. 6 this third operating mode provides a greater amount of cooling within a given period of time than the other operating modes, it is subject to the possible disadvantage that it produces relatively rapid cooling even during the initial part of the cooling cycle. Such initially rapid cooling is sometimes undesirable from the point of view of securing more nearly complete reduction of the sponge iron and also achieving a predetermined desired carburization thereof. In most cases the cooling patterns of FIGS. 4 and 5 are preferable.

From the foregoing description it should be apparent that the present invention provides a reduction system capable of achieving the objectives set forth at the beginning of the present specification. By using an extended cooling cycle as disclosed herein additional cooling of the sponge iron or other reduced metal can be achieved without lengthening the overall reduction and cooling cycle. It is of course to be understood that the foregoing description is illustrative only and that numerous changes can be made in the specific embodiments described without departing from the spirit of the invention as defined in the appended claims. For example, the particular gas recycle ratios and cooling time periods given above are intended to be illustrative and can be extensively varied within the scope of the invention.

We claim:

1. In a process for the cyclical batchwise reduction of a metal oxide to sponge metal by contact with a hot reducing gas in a multiple-unit reactor system of the type in which separate fixed beds of metal-bearing material are simultaneously treated in a plurality of interchangeable reactors including at least one cooling reactor and at least one reduction reactor, a cool reducing gas is passed through at least one cooling reactor of said system, heated and then passed through at least one reduction reactor of said system for an operating cycle of predetermined duration to reduce the metal oxide to sponge metal, and at the end of an operating cycle the reactors are functionally interchanged, the improvement which comprises dividing the operating cycle into two successive time periods during the first of which periods at least a portion of the cool reducing gas is passed in series through beds of sponge metal in a first and second cooling reactor before being heated and passed through a reduction reactor of said system and during the second of which periods said first cooling reactor is disconnected from said system for discharge of cooled sponge metal therefrom and charging of fresh ore thereto and the cool reducing gas flows directly to the bed of sponge metal in said second cooling reactor.

2. A process according to claim 1 wherein during said first time period a portion of the effluent gas from said first cooling reactor is cooled and recycled thereto.

3. A process according to claim 1 wherein during said second time period a portion of the effluent gas from said second cooling reactor is cooled and recycled thereto.

4. A process according to claim 1 wherein during said first time period a portion of the effluent gas from said second cooling reactor is cooled and recycled to said first cooling reactor.

5. A process according to claim 1 wherein during said first time period a portion of the cooled effluent gas from said first cooling reactor and a portion of the cooled effluent gas from said second cooling reactor are mixed and recycled to said first cooling reactor.

6. A process according to claim 1 wherein during said first time period all of the effluent gas from said first cooling reactor is cooled and flows to said second cooling reactor and a portion of the effluent gas from said second cooling reactor is cooled and recycled to said first cooling reactor.

7. A process according to claim 2 wherein the volumetric ratio of gas recirculated to said first cooling reactor to fresh reducing gas supplied to said first cooling reactor is from 0.5:1 to 2:1.

8. A process according to claim 5 wherein the volumetric ratio of cooled and recycled gas to fresh reducing gas supplied to said second cooling reactor is from 0.5:1 to 2:1.

9. A process according to claim 1 wherein said first time period comprises from 25% to 50% of the sum of said two time periods.

10. A process according to claim 1 wherein said metal oxide is iron oxide and said sponge metal is sponge iron.

11. A process according to claim 1 wherein said reducing gas is largely composed of carbon monoxide and hydrogen.

12. A process according to claim 11 wherein said reducing gas is formed by the catalytic reformation of a methane/steam mixture.

* * * * *